United States Patent
Kim et al.

(10) Patent No.: US 12,189,836 B2
(45) Date of Patent: Jan. 7, 2025

(54) SMOKING SYSTEM FOR PROVIDING SMOKING EXPERIENCE IN VIRTUAL REALITY

(71) Applicant: KT&G CORPORATION, Daejeon (KR)

(72) Inventors: Jeong Hoo Kim, Chungcheongbuk-do (KR); Woo Seok Chung, Gyeonggi-do (KR)

(73) Assignee: KT&G CORPORATION, Daejeon (KR)

( * ) Notice: Subject to any disclaimer, the term of this patent is extended or adjusted under 35 U.S.C. 154(b) by 435 days.

(21) Appl. No.: 17/597,347

(22) PCT Filed: Oct. 6, 2020

(86) PCT No.: PCT/KR2020/013584
§ 371 (c)(1),
(2) Date: Jan. 4, 2022

(87) PCT Pub. No.: WO2021/071208
PCT Pub. Date: Apr. 15, 2021

(65) Prior Publication Data
US 2022/0248772 A1    Aug. 11, 2022

(30) Foreign Application Priority Data
Oct. 10, 2019 (KR) .................. 10-2019-0125684

(51) Int. Cl.
*G06F 3/01* (2006.01)
*A24B 13/00* (2006.01)
(Continued)

(52) U.S. Cl.
CPC .............. *G06F 3/011* (2013.01); *A24B 13/00* (2013.01); *A24F 40/00* (2020.01); *A24F 40/60* (2020.01);
(Continued)

(58) Field of Classification Search
None
See application file for complete search history.

(56) References Cited

U.S. PATENT DOCUMENTS 9,648,907 B2    5/2017  Kobal et al.
10,897,931 B2   1/2021  Azzopardi et al.
(Continued)

FOREIGN PATENT DOCUMENTS

CN    101171565 A    4/2008
CN    204128132 U    1/2015
(Continued)

OTHER PUBLICATIONS

Extended European Search Report issued Jul. 18, 2022 in European Application No. 20874543.0.
(Continued)

*Primary Examiner* — Jwalant Amin
(74) *Attorney, Agent, or Firm* — Sughrue Mion, PLLC

(57) ABSTRACT

A virtual smoking system includes: a display device configured to display an image of a virtual reality or augmented reality in which cigarette smoke is generated in response to a user wearing the display device puffing or ingesting an article containing nicotine; a reproducing device configured to reproduce sound in response to a user wearing the reproducing device puffing or ingesting the article, thereby providing a user with a virtual smoking experience.

13 Claims, 4 Drawing Sheets

(51) Int. Cl.
    *A24F 40/00*     (2020.01)
    *A24F 40/60*     (2020.01)
    *A24F 47/00*     (2020.01)
    *G02B 27/01*     (2006.01)
    *G06F 3/16*     (2006.01)
    *G06T 19/00*     (2011.01)
    *H04R 1/10*     (2006.01)
    *A24B 15/16*     (2020.01)
    *A24F 40/50*     (2020.01)
    *A24F 40/65*     (2020.01)

(52) U.S. Cl.
    CPC ............ *A24F 47/00* (2013.01); *G02B 27/017* (2013.01); *G02B 27/0172* (2013.01); *G06F 3/165* (2013.01); *G06T 19/00* (2013.01); *H04R 1/10* (2013.01); *A24B 15/16* (2013.01); *A24F 40/50* (2020.01); *A24F 40/65* (2020.01); *G02B 2027/0141* (2013.01); *G02B 2027/0178* (2013.01)

(56) References Cited

U.S. PATENT DOCUMENTS

| | | |
|---|---|---|
| 2003/0227470 A1 | 12/2003 | Genc et al. |
| 2004/0104935 A1 | 6/2004 | Williamson et al. |
| 2004/0131232 A1 | 7/2004 | Meisner et al. |
| 2005/0179617 A1 | 8/2005 | Matsui et al. |
| 2007/0006889 A1 | 1/2007 | Kobal et al. |
| 2013/0298921 A1 | 11/2013 | Williams |
| 2013/0340775 A1 | 12/2013 | Juster et al. |
| 2015/0181930 A1 | 7/2015 | Liu |
| 2017/0020196 A1 | 1/2017 | Cameron |
| 2017/0196260 A1 | 7/2017 | Kobal et al. |
| 2019/0000147 A1 | 1/2019 | Koc et al. |
| 2019/0001478 A1 | 1/2019 | Bantle et al. |
| 2019/0088022 A1 | 3/2019 | Ochiai |
| 2019/0260930 A1* | 8/2019 | Van Hoff .............. H04N 13/194 |
| 2020/0022905 A1 | 1/2020 | Kosik et al. |

FOREIGN PATENT DOCUMENTS

| | | |
|---|---|---|
| CN | 105453598 A | 3/2016 |
| CN | 107128610 A | 9/2017 |
| CN | 207181824 U | 4/2018 |
| JP | 2019-508026 A | 3/2019 |
| KR | 20-0280044 Y1 | 6/2002 |
| KR | 10-2008-0014742 A | 2/2008 |
| KR | 10-2011-0114552 A | 10/2011 |
| KR | 10-2012-0126157 A | 11/2012 |
| WO | 2008/117886 A1 | 10/2008 |

OTHER PUBLICATIONS

Office Action issued Aug. 29, 2023 in Chinese Application No. 202080068967.7.
Office Action issued Mar. 22, 2023 in Chinese Application No. 202080068967.7.
Office Action issued Feb. 21, 2023 in Japanese Application No. 2022-503943.
Korea Intellectual Property Office Notification of Reason for Refusal for KR 10-2019-0125684 dated Jul. 29, 2021.
International Search Report for PCT/KR2020/013584 dated Jan. 15, 2021 [PCT/ISA/210].
Written Opinion for PCT/KR2020/013584 dated Jan. 15, 2021 [PCT/ISA/237].

* cited by examiner

SMOKING SYSTEM FOR PROVIDING SMOKING EXPERIENCE IN VIRTUAL REALITY

CROSS REFERENCE TO RELATED APPLICATIONS

This application is a National Stage of International Application No. PCT/KR2020/013584 filed Oct. 6, 2020, claiming priority based on Korean Patent Application No. 10-2019-0125684 filed Oct. 10, 2019.

TECHNICAL FIELD

The present disclosure relates to a smoking system.

BACKGROUND ART

Display technologies such as virtual reality (VR) or augmented reality (AR) make a user feel as if the output image is real. These technologies may provide a user with various experiences that may be unfeasible in reality.

Recently, in a field of electronic cigarettes, demand for devices for implementing virtual reality or augmented reality services is increasing, and accordingly, various researches are being conducted.

DISCLOSURE

Technical Solution

One or more embodiments provide a smoking system. In addition, one or more embodiments provide a method of controlling a smoking system. Further, one or more embodiments provide a computer-readable recording medium in which a program for executing the method on a computer is recorded. The technical problems to be solved by the present embodiments are not limited to the technical problems described above, and other technical problems may be derived from the following embodiments.

A first aspect of the present disclosure may provide a smoking system comprising: a display device configured to display an image of a virtual reality or augmented reality in which cigarette smoke is generated in response to a user wearing the display device puffing or ingesting an article containing nicotine; a reproducing device configured to reproduce sound in response to a user wearing the reproducing device puffing or ingesting the article.

In addition, the display device may change the image based on content information of the article.

In addition, the display device may change an image associated with at least one of the color of the cigarette smoke, the amount of the cigarette smoke, and the shape of the cigarette smoke based on the content information.

In addition, the reproducing device may change characteristics of the sound based on the content information.

In addition, the reproducing device may change at least one of an amplitude and a frequency of the sound based on the content information.

In addition, the display device may include at least one of an earphone, a headphone, and a bone conduction speaker.

In addition, a shape of the article may be any one of a cigarette shape and a pill shape.

In addition, the reproducing device include any one of a headphone and an earphone.

A second aspect of the present disclosure may provide a method of controlling a smoking system comprising a display device and a reproducing device, the method comprising: controlling the display device to display an image of a virtual reality or augmented reality in which cigarette smoke is generated in response to a user wearing the display device puffing or ingesting an article containing nicotine; and controlling the reproducing device to reproduce sound in response to a user wearing the reproducing device puffing or ingesting the article.

In addition, the controlling the display device may include changing the image based on content information of the article.

In addition, the controlling of the display device may include changing an image associated with at least one of a color of the cigarette smoke, an amount of the cigarette smoke, and a shape of the cigarette smoke based on the content information.

In addition, the controlling of the reproducing device may include changing characteristics of the sound based on content information of the article.

In addition, the controlling of the reproducing device may include changing at least one of an amplitude and a frequency of the sound based on the content information.

A third aspect of the present disclosure may provide a computer-readable recording medium having recorded thereon a program for executing the method according to the second aspect on a computer.

Advantageous Effects

According to the present disclosure, the display device, the article, and the reproducing device, which are included in the smoking system, cooperate with each other, so that it may be possible to provide a more improved smoking experience to the user using the smoking system.

According to the present disclosure, a user using a smoking system may provide a sufficient feeling of smoking and satisfaction even if a reduced amount of nicotine is provided.

MODE FOR INVENTION

With respect to the terms used to describe the various embodiments, general terms that are currently and widely used are selected in consideration of functions of structural elements in the various embodiments of the present disclosure. However, meanings of the terms can be changed according to intention, a judicial precedence, the appearance of new technology, and the like. In addition, in certain cases, a term that is not commonly used may be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, one or more embodiments will be described in detail with reference to the accompanying drawings.

Figure 1:
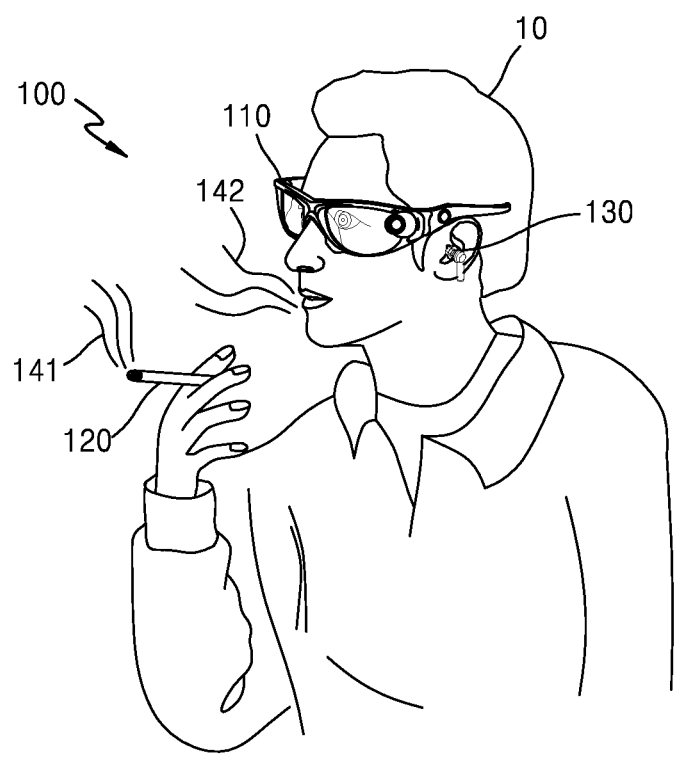
FIG. 1 is a diagram illustrating an example in which a user uses a smoking system according to an embodiment.

FIG. 1 is a diagram illustrating an example in which a user uses a smoking system 100 according to an embodiment.

Referring to FIG. 1, the smoking system 100 may include a display device 110, an article 120, and a reproducing device 130. A user 10 who wants to use the smoking system 100 may wear the display device 110 and the reproducing device 130 and puff on or ingest the article 120.

Specifically, when the user 10 wears the display device 110, the display device 110 may provide the user with an image of virtual reality or augmented reality in which cigarette smoke is generated. In addition, in a case where the article 120 contains nicotine, when the user 10 puffs on or ingests the article 120, the article 120 may provide nicotine to the user 10. In addition, when the user 10 wears the reproducing device 130, the reproducing device 130 may reproduce sound so that dopamine is secreted in the user 10.

In an embodiment, the display device 110 may detect a position of the article 120. The display device 110 may display a first image 141 portraying smoke emitted from the article 120 based on the position of the article 120. The display device 110 may detect a position of the mouth of the user 10. The display device 110 may display a second image 142 portraying smoke blown from the mouth of the user 10 based on the position of the mouth of the user 10.

In addition, the display device 110 may detect a direction of the gaze of the user 10. The display device 110 may differently set the position, size, and the like of the smoke image to be displayed on the screen based on the direction of the gaze of the user 10.

In an embodiment, the article 120 may have a shape of a typical cigarette. In this case, nicotine may be coated on the surface of one end portion of the article 120, or nicotine may be contained inside the one end portion of the article 120. When the user 10 puffs on the one end portion of the article 120, the article 120 may provide nicotine to the user 10. In another embodiment, the article 120 may have a pill shape. When the user 10 ingests the article 120, the article 120 may provide nicotine to the user 10. However, the shape of the article 120 is not limited thereto.

In an embodiment, the reproducing device 130 may induce dopamine to be secreted from the user's brain by reproducing sound. For example, the reproducing device 130 may continuously reproduce sound in a specific frequency band or play music that suits the user's taste so that the dopamine is secreted from the user's brain.

In the present disclosure, the display device 110, the article 120, and the reproducing device 130, which are included in the smoking system 100, work together to provide a more improved smoking experience to the user 10 using the smoking system 100. A communication method between the display device 110, the article 120 and the reproducing device 130 may include at least one of wireless local area network (wireless LAN), wireless fidelity (Wi-Fi), Bluetooth, ZigBee, Wi-Fi Direct (WFD), ultra wideband (UWB), infrared data association (IrDA), Bluetooth low energy (BLE), near field communication (NFC), and Ant+, but is not limited thereto.

In an embodiment, the display device 110 may receive content information of the article 120. The content information for the article 120 may include information about nicotine content, flavor content, and the like. The display device 110 may change an image displayed on the screen based on the content information of the article 120.

Specifically, the display device 110 may change an image associated with at least one of a color of the cigarette smoke, the amount of the cigarette smoke, and the shape of the cigarette smoke based on the content information of the article 120. For example, when the display device 110 receives information indicating that nicotine content in the article 120 is greater than or equal to a preset amount, the display device 110 may change the image such that the color of the cigarette smoke is darker or the amount of the cigarette smoke is larger. As another example, when the display device 110 receives information indicating that a strawberry flavor is included from the article 120, the display device 110 may change the color of the cigarette smoke to red.

In an embodiment, the reproducing device 130 may receive content information of the article 120. The reproducing device 130 may change the characteristics of the sound provided to the user based on the content information of the article 120.

Specifically, the reproducing device 130 may change at least one of an amplitude and a frequency of the sound based on the content information of the article 120. For example, when a computer receives information indicating that the article contains a preset amount or more of nicotine, the reproducing device 130 may increase an amplitude of an output sound. As another example, when the reproducing device 130 receives information indicating that a specific flavor is contained in the article 120, the reproducing device 130 may change the output sound so that music more consistent with the specific flavor is reproduced.

Figure 2A:
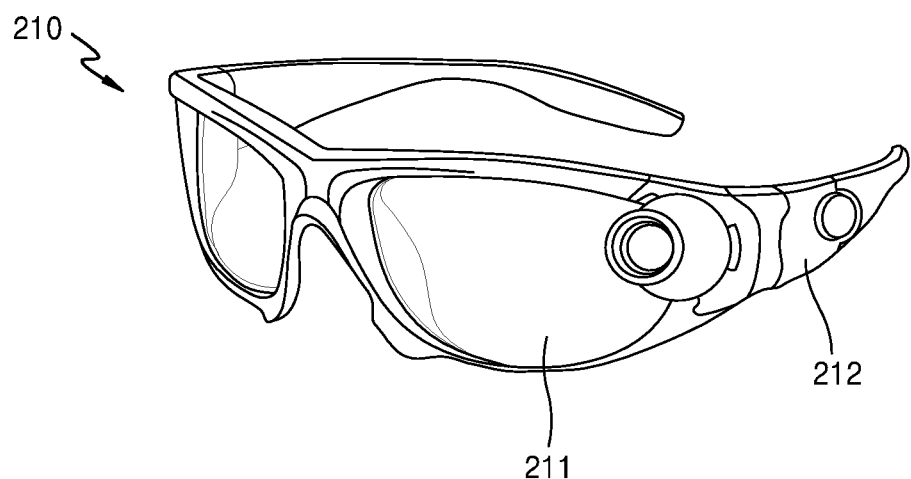
FIGS. 2A and 2B are diagrams illustrating examples of a display device and a reproducing device for reproducing sound according to an embodiment.
Figure 2B:
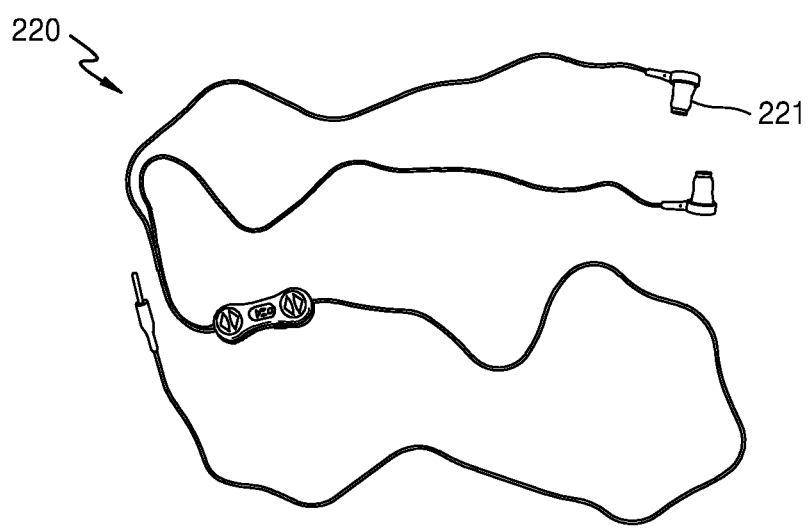

FIGS. 2A and 2B are diagrams illustrating examples of a display device and a reproducing device for reproducing sound according to an embodiment.

Referring to FIG. 2A, virtual reality or augmented reality glasses 210 are shown as an example of a display device. The glasses 210 may include a screen 211 and leg portions 212.

When a user using the smoking system wears glasses 210, the leg portions 212 of the glasses 210 may be seated on the user's ears. However, the glasses 210 may include a band (not shown) instead of the leg portions 212, and in this case, a band (not shown) may be worn on the user's head portion.

The glasses 210 may provide a virtual reality image or augmented reality image to the user through the screen 211, which portrays cigarette smoke. In an embodiment, the screen 211 may be controlled to be transparent or opaque according to the purpose of use. When the glasses 210 provide a virtual reality image, the screen 211 may be controlled to become opaque, and when the glasses 210 provide an augmented reality image, the screen 211 may be controlled to become transparent.

For example, the screen 211 may be made of a plastic material such as polycarbonate or made of glass material, but is not limited thereto. In addition, at least one of an anti-reflective coating, an anti-glare coating, an anti-fog coating, and a UV blocking coating may be applied to the screen 211.

The smoking system may include the glasses 210 and an article 120. The glasses 210 may receive content information of the article 120 from the article 120. The glasses 210 may change an image displayed on the screen 211 based on the content information of the article 120.

In an embodiment, an image representing cigarette smoke may be displayed on the screen 211, and the glasses 210 may change an image associated with at least one of the color of the cigarette smoke, the amount of the cigarette smoke, and the shape of the cigarette smoke, which are displayed on the screen 211, based on the content information of the article 120.

Referring to FIG. 2B, an earphone 220 is shown as an example of a sound reproducing device. When a user using the smoking system wears the earphone 220, the head 221 of the earphone 220 may be inserted into the user's ear. However, an example of the sound reproducing device is not limited to the earphone 220 shown in FIG. 2B, and may include a headphone, a bone conduction speaker, and the like.

The earphone 220 may induce dopamine to be secreted from the user's brain by reproducing sound. For example, the earphone 220 may continuously reproduce sound in a specific frequency band or play music that suits the user's taste so that the dopamine is secreted from the user's brain.

The smoking system may include the earphone 220 and an article 120. The earphone 220 may receive content information of the article 120 from the article 120. The earphone 220 may determine the sound to be reproduced based on the content information of the article 120.

In an embodiment, the earphone 220 may change at least one of an amplitude and a frequency of a sound based on the content information of an article 120. Also, the earphone 220 may change music based on the content information of the article 120.

Figure 3:
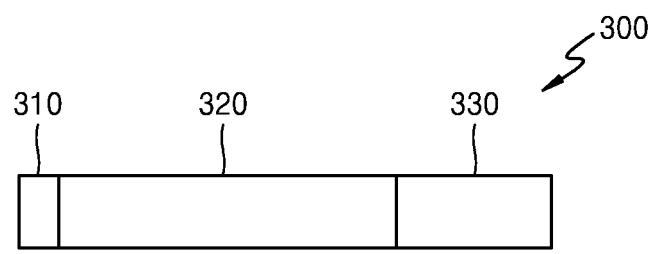
FIG. 3 is a diagram illustrating an example of an article according to an embodiment.

FIG. 3 is a diagram illustrating an example of an article according to an embodiment.

Referring to FIG. 3, the article 300 may have a cigarette shape. A length and diameter of the article 300 may be substantially the same as a length and diameter of a typical cigarette. In addition, the outer surface of the article 300 may be wrapped with a cigarette wrapper. The article 300 may be divided into a first end portion 310, a middle portion 320 and a second end portion 330.

The first end portion 310 may be a portion for imitating the ignition part of a traditional cigarette. The first end portion 310 may include a light emitting diode (LED). For example, the first end portion 310 may include a red LED.

The second end portion 330 may include nicotine. In an embodiment, the surface of the second end portion 330 may be coated with nicotine, or nicotine may be contained inside the second end portion 330. When the user puffs on the second end portion 330 of the article 300, the article 300 may provide nicotine to the user. Meanwhile, in addition to nicotine, the second end portion 330 may further contain flavors.

The middle portion 320 serves to connect the first end portion 310 and the second end portion 330. The total length of the article 300 is determined according to a length of the middle portion 320. When manufacturing the article 300, the length of the middle portion 320 may be set so that the length of the article 300 corresponds to the length of a traditional cigarette.

In another embodiment, the article 300 may have a pill shape. When the user ingests the article 300, the article 300 may provide nicotine to the user.

Figure 4:
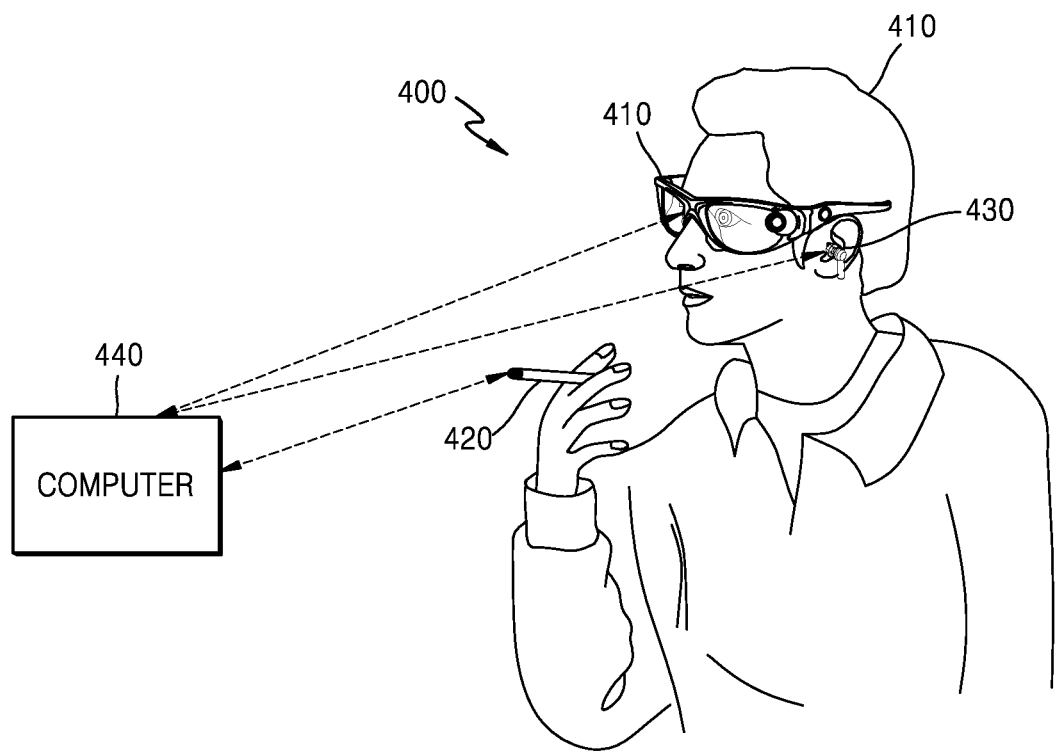
FIG. 4 is a diagram for explaining an example of a smoking system including a separate computer according to an embodiment.

FIG. 4 is a diagram for explaining an example of a smoking system 400 including a separate computer 440 according to an embodiment.

Referring to FIG. 4, the smoking system 400 may include a display device 410, an article 420, and a reproducing device 430. A user 40 who wants to use the smoking system 400 may wear the display device 410 and the reproducing device 430 and may puff on or ingest the article 420.

Specifically, when a user 40 wears the display device 410, the display device 410 may provide the user with an image of a virtual reality or augmented reality in which cigarette smoke is generated. In addition, in a case where the article 420 contains nicotine, when the user 40 puffs on or ingests the article 420, the article 420 may provide nicotine to the user 40. In addition, when the user 40 wears the reproducing device 430, the reproducing device 430 may reproduce sound so that dopamine is secreted in the user 40.

Compared with the smoking system in FIG. 1, the smoking system 400 in FIG. 4 may further include a separate computer 440. The computer 440 is hardware that controls an overall operation of the smoking system 400. The computer 440 includes at least one processor. The computer 440 may be implemented as an array of a plurality of logic gates or may be implemented as a combination of a general-purpose microprocessor and a memory in which a program executable in the microprocessor is stored. In addition, those skilled in the art to which the present embodiment belongs can understand that the computer 440 may be implemented as other types of hardware.

The computer 440 may further include a communication unit (not shown). The computer 440 may control operations of the display device 410, article 420, and reproducing device 430 by transmitting and receiving data to and from the display device 410, article 420, and reproducing device 430.

A communication unit of the computer 440 may communicate with other devices of the smoking system 400 through a communication method using at least one of wireless local area network (wireless LAN), wireless fidelity (Wi-Fi), Bluetooth, ZigBee, Wi-Fi Direct (WFD), ultra wideband (UWB), infrared data association (IrDA), Bluetooth low energy (BLE), near field communication (NFC), and Ant+, but the communication method is not limited thereto.

The computer 440 may receive content information of the article 420 from the article 420. The content information of the article 420 may include information about nicotine content, flavor content, and the like. The content information received from the article 420 may be stored in a memory of the computer 440.

The memory may be hardware storing various types of data processed in the computer 440. The memory may store data processed and data to be processed by the computer 440. The memory may be embodied as various types, such as random access memory (RAM) such as dynamic random access memory (DRAM) and static random access memory (SRAM), read-only memory (ROM), and electrically erasable programmable read-only memory (EEPROM).

A control signal (i.e., data) to be transmitted to the display device 410 and the reproducing device 430 according to the content information of the article 420 may be stored in the memory of the computer 440. That is, the computer 440 may control the display device 410 and the reproducing device 430 transmitting a control signal to the display device 410 and/or the reproducing device 430 based on the content information of the article 420.

In an embodiment, the computer 440 may receive the content information of the article 420 from the article 420 and control the display device 410 and the reproducing device 430 based on the received content information.

Specifically, the computer 440 may control the display device 410 so that an image associated with cigarette smoke displayed on the display device 410 is changed based on the content information received from the article 420. For example, the computer 440 may control the display device 410 so that an image associated with at least one of the color of the cigarette smoke, the amount of the cigarette smoke, and the shape of the cigarette smoke is changed based on the content information received from the article 420.

In addition, the computer 440 may control the reproducing device 430 to change the characteristics of the sound reproduced in the reproducing device 430 based on the content information received from the article 420. For example, the computer 440 may control the reproducing device 430 to change at least one of the amplitude and the frequency of the sound based on the content information received from the article 420.

In another embodiment, the content information of the article 420 may be obtained in different manners. For example, the display device 410 (i.e., wearable glasses) may identify the article by recognizing an identifier of the article, such as a pattern or a trademark printed on the article, and retrieve the content information from its internal memory or receive the content information from an external server via wireless communication. As another example, the article 420 or the display device 410 may send an identifier of the article 420 to the computer 440, and then the computer 440 may retrieve content information of the article from an external server.

Figure 5:
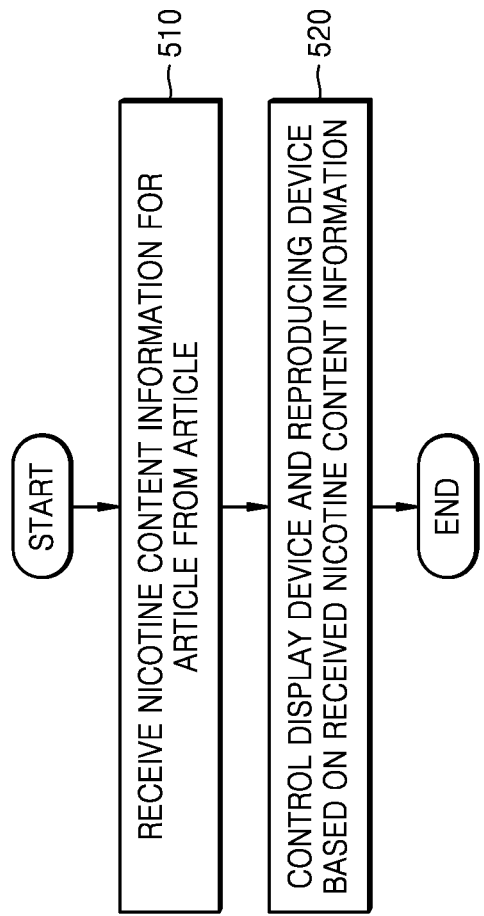
FIG. 5 is a flowchart illustrating a method of controlling a smoking system according to an embodiment.

FIG. 5 is a flowchart illustrating a method of controlling a smoking system according to an embodiment.

The smoking system may include a display device, an article, and a reproducing device. A user who wants to use the smoking system may wear the display device and the reproducing device and may puff on or ingest an article.

The display device may display an image of a virtual reality or augmented reality in which cigarette smoke is generated. The reproducing device may reproduce sound so that dopamine is secreted in the user. In addition, the article may contain nicotine.

Additionally, the smoking system may include a computer. The computer may control operations of the display device, the article, and the reproducing device by transmitting and receiving data to and from the display device, the article, and the reproducing device.

Referring to FIG. 5, in operation 510, the computer may receive nicotine content information for the article from the article.

Content information of the article may include nicotine content information, flavor content information, and the like. The content information received from the article may be stored on the computer.

In the computer, control signals (i.e., data) to be transmitted to the display device and the reproducing device according to the content information of the article may be stored. That is, the computer may control the display device and the reproducing device after receiving the content information of the article by transmitting a control signal corresponding to the content information to any one of the display device and the reproducing device.

In operation 520, the computer may control the display device and/or the reproducing device based on the received nicotine content information.

The computer may control the display device to change an image associated with cigarette smoke displayed on the display device based on the content information received from the article. The computer may control the display device to change an image associated with at least one of the color of the cigarette smoke, the amount of the cigarette smoke, and the shape of the cigarette smoke based on the content information received from the article.

For example, when the computer receives information indicating that the article contains a preset amount or more of nicotine, the computer may control the display device such that the color of the cigarette smoke displayed on the display device becomes darker or the amount of the cigarette smoke displayed on the display device becomes larger. As another example, when the computer receives information indicating that the article contains a strawberry flavor, the display device may control the display device so that the color of the cigarette smoke becomes red.

In addition, the computer may control the reproducing device to change the characteristics of the sound reproduced in the reproducing device based on the content information received from the article. The computer may control the reproducing device to change at least one of an amplitude and a frequency of a sound based on the content information received from the article.

For example, when the computer receives information indicating that the article contains a preset amount or more of nicotine, the computer may control the reproducing device so that the amplitude of the sound output from the reproducing device becomes larger. As another example, when the computer receives information indicating that the article contains a specific flavor, the computer may control the reproducing device such that music more suited to the specific flavor is reproduced in the reproducing device.

One embodiment may also be implemented in the form of a computer-readable recording medium including instructions executable by a computer, such as a program module executable by the computer. The computer-readable recording medium may be any available medium that can be accessed by a computer and includes both volatile and nonvolatile media, and removable and non-removable media. In addition, the computer-readable recording medium may include both a computer storage medium and a communication medium. The computer storage medium includes all of volatile and nonvolatile, and removable and non-removable media implemented by any method or technology for storage of information such as computer-readable instructions, data structures, program modules or other data. The communication medium typically includes computer-readable instructions, data structures, other data in modulated data signals such as program modules, or other transmission mechanisms, and includes any information transfer media.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. A smoking system comprising:
a display device configured to display an image of a virtual reality or augmented reality in which cigarette smoke is generated in response to a user wearing the display device puffing or ingesting an article containing nicotine; and
a sound reproducing device configured to reproduce sound in response to a user wearing the sound reproducing device puffing or ingesting the article,
wherein the sound reproducing device is further configured to change characteristics of the sound based on content information of the article, the content information being information of at least one of nicotine content or flavor content of the nicotine.

2. The smoking system of claim 1, wherein the display device is configured to change the image based on content information of the article.

3. The smoking system of claim 2, wherein the display device is configured to change an image associated with at least one of a color of the cigarette smoke, an amount of the cigarette smoke, and a shape of the cigarette smoke based on the content information.

4. The smoking system of claim 1, wherein the sound reproducing device is configured to change at least one of an amplitude and a frequency of the sound based on the content information.

5. The smoking system of claim 1, further comprising at least one of an earphone, a headphone, and a bone conduction speaker.

6. The smoking system of claim 1, wherein a shape of the article is a cigarette shape or a pill shape.

7. The smoking system of claim 1, wherein the sound reproducing device includes a headphone or an earphone.

8. A method of controlling a smoking system comprising a display device and a sound reproducing device, the method comprising:
controlling the display device to display an image of a virtual reality or augmented reality in which cigarette smoke is generated in response to a user wearing the display device puffing or ingesting an article containing nicotine; and
controlling the sound reproducing device to reproduce sound in response to a user wearing the sound reproducing device puffing or ingesting the article,
wherein the controlling of the sound reproducing device comprises changing characteristics of the sound based on content information of the article, the content information being information of at least one of nicotine content or flavor content of the nicotine.

9. The method of claim 8, wherein the controlling of the display device comprises changing the image based on content information of the article.

10. The method of claim 9, wherein the controlling of the display device comprises changing an image associated with at least one of a color of the cigarette smoke, an amount of the cigarette smoke, and a shape of the cigarette smoke based on the content information.

11. The method of claim 9, wherein the controlling of the sound reproducing device comprises changing at least one of an amplitude and a frequency of the sound based on the content information.

12. The method of claim 8, further comprising receiving content information of the article from the article, wherein at least one of the image and the sound is changed based on the content information.

13. A non-transitory computer-readable recording medium in which a program for executing the method of claim 9 on a computer is recorded.

* * * * *